United States Patent
Behrendt

(10) Patent No.: US 10,759,932 B2
(45) Date of Patent: Sep. 1, 2020

(54) MOLDING COMPOUND, METHOD FOR THE PREPARATION OF SAID MOLDING COMPOUND, ELECTRONIC COMPONENT, AND MOTOR VEHICLE

(71) Applicant: Volkswagen Aktiengesellschaft, Wolfsburg (DE)

(72) Inventor: Reiner Nico Behrendt, Münchberg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 39 days.

(21) Appl. No.: 16/096,942

(22) PCT Filed: May 9, 2017

(86) PCT No.: PCT/EP2017/060976
§ 371 (c)(1),
(2) Date: Oct. 26, 2018

(87) PCT Pub. No.: WO2017/202596
PCT Pub. Date: Nov. 30, 2017

(65) Prior Publication Data
US 2019/0092934 A1    Mar. 28, 2019

(30) Foreign Application Priority Data

May 24, 2016 (DE) .................. 10 2016 208 923

(51) Int. Cl.
| | |
|---|---|
| C08L 23/12 | (2006.01) |
| C08L 63/00 | (2006.01) |
| C08L 67/06 | (2006.01) |
| H01B 3/40 | (2006.01) |
| H01B 3/44 | (2006.01) |
| C08L 61/28 | (2006.01) |
| C08L 79/08 | (2006.01) |
| C08L 23/10 | (2006.01) |

(52) U.S. Cl.
CPC ............... *C08L 23/12* (2013.01); *C08L 23/10* (2013.01); *C08L 61/28* (2013.01); *C08L 63/00* (2013.01); *C08L 67/06* (2013.01); *C08L 79/08* (2013.01); *H01B 3/40* (2013.01); *H01B 3/441* (2013.01); *C08L 2203/20* (2013.01)

(58) Field of Classification Search
CPC .......... C08L 23/12; C08L 61/28; C08L 23/10; C08L 79/08; C08L 63/00; C08L 2203/20; H01B 3/441; H01B 3/40
See application file for complete search history.

(56) References Cited

U.S. PATENT DOCUMENTS

| | | | |
|---|---|---|---|
| 6,331,343 | B1 | 12/2001 | Perez et al. |
| 2003/0043586 | A1 | 3/2003 | Sagal et al. |
| 2004/0266899 | A1 | 12/2004 | Muenz et al. |
| 2011/0220851 | A1 | 9/2011 | Sue et al. |

FOREIGN PATENT DOCUMENTS

| | | |
|---|---|---|
| DE | 1495072 A1 | 11/1969 |
| DE | 10 2007 050 047 A1 | 4/2009 |
| DE | 10 2009 050 758 A1 | 4/2011 |
| DE | 10 2013 004 659 A1 | 9/2014 |
| DE | 10 2015 207 110 A1 | 10/2016 |
| EP | 0865910 A1 | 9/1998 |
| EP | 2882268 A1 | 6/2015 |
| JP | S57-172612 | 10/1982 |
| JP | 2002-015621 | 1/2002 |
| JP | 2002-544310 | 12/2002 |
| JP | 2004-171799 | 6/2004 |
| JP | 2005-502172 | 1/2005 |
| JP | 2005-513226 | 5/2005 |
| JP | 2010-059532 | 3/2010 |
| JP | 2013-515847 | 5/2013 |
| WO | WO 00/68301 | 11/2000 |
| WO | WO 2006/030537 | 3/2006 |
| WO | WO 2016/169874 A1 | 10/2016 |

OTHER PUBLICATIONS

Search report for German Patent Application No. 10 2016 208 923.4, dated Jul. 12, 2017.
International Search Report of PCT Application No. PCT/EP2017/060976, dated May 9, 2017.

*Primary Examiner* — Nathan M Nutter
(74) *Attorney, Agent, or Firm* — Pearl Cohen Zedek Latzer Baratz LLP

(57) ABSTRACT

The invention relates to a molding compound (100) for electronic components, comprising a plastic main matrix (10) into which a polypropylene plastic particles (11) having a beta-crystallite structure are introduced.

14 Claims, 4 Drawing Sheets

MOLDING COMPOUND, METHOD FOR THE PREPARATION OF SAID MOLDING COMPOUND, ELECTRONIC COMPONENT, AND MOTOR VEHICLE

CROSS-REFERENCE TO RELATED APPLICATIONS

This application is a National Phase Application of PCT International Application No. PCT/EP2017/060976, International Filing Date May 9, 2017, claiming priority of German Patent Application No. 2016 10 208 923.4, filed May 24, 2016, which is hereby incorporated by reference.

FIELD OF THE INVENTION

The invention relates to a molding compound for electronic components. Moreover, the invention relates to a method for the preparation of a molding compound as well as to an electronic component having such a molding compound, and to a motor vehicle having such an electronic component.

BACKGROUND OF THE INVENTION

When it comes to molding compounds for electronic components, for instance, electronic components for power electronics such as, for example, electric machines which can have, for instance, a laminated core, wire windings and a connector ring, the challenge is to put forward a molding compound that has the highest possible strength, a high resistance to media and a high tolerance against heat-induced expansion and shrinkage of the individual parts of the electronic components that are to be molded, a so-called delta-alpha tolerance.

If the molding compounds are made of a thermosetting plastic having a high cross-linking density, then, even though they exhibit sufficiently high strength and media resistance, their delta-alpha tolerance is too low. Due to the shrinkage of the individual parts of the electronic component during the cooling process in conjunction with a reduction of the free volume associated with the curing of the thermosetting plastic, such molding compounds tend towards crack formation in case of a strong substrate adhesion and thin layers, and they tend towards detachment of the molding compound from the substrate and thus towards detachment of the parts of the electronic component in case of a weak substrate adhesion and thick layers. It is precisely the curing process followed by cooling that has to be seen as being critical since the metal parts of the electronic component that serve as the substrate for the molding compound contract in this process and the molding compound itself is already quite strongly cross-linked. As a result, stresses arise in the molding compound which, either immediately or during later operation of the electronic component, can lead to the above-mentioned effects such as crack formation and/or detachment of the molding compound.

It is a known procedure to finely disperse elastomer particles in the thermosetting plastic of the molding compound in order to be able to stop cracks that are being formed in the molding compound due to crack dissipation. Such molding compounds display a relatively high strength and also a certain level of toughness, especially in the case of an abrupt stress. It is a known procedure to employ, for instance, acrylonitrile butadiene rubbers (NBR) as the elastomer particles, although these become brittle at temperatures above approximately 100° C. to 130° C., thus achieving precisely the opposite of the actual toughness modification. Consequently, the use of such molding compounds is very restricted in terms of their application temperatures since the elastomer particles become brittle or decompose within the temperature range of approximately 100° C. to 130° C. Such molding compounds cannot be used in electronic components such as, for example, also electric machines, which can display relatively high operating temperatures of up to 150° C.

Before this backdrop, the objective of the present invention is to put forward a molding compound that is characterized by its high strength and resistance to media while also displaying a high delta-alpha tolerance.

SUMMARY OF THE INVENTION

The objective according to the invention is achieved by means of the features of the independent claims. Preferred embodiments and refinements of the invention are presented in the dependent claims.

The molding compound according to the invention is characterized in that it has a plastic main matrix, whereby polypropylene plastic particles having a beta-crystallite structure are incorporated into the plastic main matrix.

The invention is also characterized by a method for the preparation of a molding compound, whereby polypropylene plastic particles having a beta-crystallite structure are incorporated into a plastic main matrix.

Polypropylene plastic particles having a beta-crystallite structure are characterized by a very high degree of toughness. Beta nucleation agents are added to the polypropylene plastic particles in order to form the beta-crystallite structure. Beta spherolites are created in the polypropylene plastic particles due to the use of these beta nucleation agents. Upon exposure to tensile stress, compressive stress or impact stress, the beta crystallites are pushed against each other, thus forming microscopically small pores, so-called micro-voids which, as a function of the stress, can absorb the energy applied into the material. This effect can be utilized to reduce the tension in the molding compound. Since the polypropylene plastic particles having a beta-crystallite structure display a very high extensibility, the polypropylene plastic particles having a beta-crystallite structure absorb the material stresses that occur when the plastic main matrix is curing and when parts of the electronic component are cooling off in that the forces generated by the material stresses that occur can be dissipated from the plastic main matrix into the polypropylene plastic particles having a beta-crystallite structure. Owing to the absorption of the forces, a kind of toughness modification takes place since the β-spherolites of the polypropylene can reduce the forces through the formation of the porous structures. In addition, the formation of porous structures can improve the adhesion between the plastic main matrix and the polypropylene plastic particles having a beta-crystallite structure. A molding compound configured in such a manner is characterized by a high temperature stability, so that said compounds can also be employed for electronic components such as electric machines that operate at a high operating temperature. For the preparation of the molding compound, the plastic main matrix is first mixed with polypropylene plastic particles having a beta-crystallite structure and the mixture is subsequently heated up, kept at an elevated temperature for a certain period of time in order to cure and finally cooled off.

In order to improve the wettabilty of the polypropylene plastic particles with the plastic main matrix, the polypropylene plastic particles can be pretreated with a hydrophilic additive or they can undergo a plasma treatment. An example of a hydrophilic additive that can be used is Irgasurf® HL 560. The hydrophilic additive is preferably applied onto the polypropylene plastic particles before the polypropylene plastic particles are mixed with the plastic main matrix.

Preferably, the polypropylene plastic particles are incorporated in fiber or powder form into the plastic main matrix. In the case of a fibrous configuration, the polypropylene plastic particles are preferably configured in the form of short fibers. The fibers offer a larger surface area for the formation of the pores, so that a very good absorption of forces from the plastic main matrix and thus a very good stress reduction can be achieved in the molding compound. In the case of the fibrous configuration, for the most part, polypropylene granules additivated with beta-nucleation agents are processed into fibers or fiber laid non-wovens by means of melt-blown or spinning processes. In the case of a pulverulent configuration, polypropylene granules that have preferably been additivated with beta-nucleation agents are ground up. If polypropylene plastic particles in powder form are incorporated into the main plastic matrix, the polypropylene plastic particles and the plastic main matrix can be mixed more easily than in comparison to fibers, as a result of which a particularly uniform distribution of the polypropylene plastic particles in the plastic main matrix can be achieved.

The polypropylene plastic particles incorporated in fiber form can have a fiber diameter between 50 nm and 500 µm, preferably between 100 nm and 100 µm.

If the incorporated polypropylene plastic particles (11) are in powder form, they can have a particle diameter between 0.1 µm and 1000 µm, preferably between 10 µm and 1000 µm.

In order to achieve a very high strength for the molding compound, the plastic main matrix preferably consists of a thermosetting plastic. After the thermosetting plastic has cured and thus undergone cross-linking, it can no longer be shaped, as a result of which the entire molding compound can no longer be shaped, thus exhibiting a very high strength and stiffness.

Preferably, the thermosetting plastic is an epoxy resin. Epoxy resins are characterized by their good mechanical properties as well as by a good temperature resistance and resistance to chemicals. However, unsaturated polyester resins, vinyl ester resins, melamine formaldehyde resins, polyamide resins, isocyanate resins or isocyanurate resins, for example, can also be employed as thermosetting plastics.

The invention is also characterized by an electronic component that has at least one electronic part and a molding compound that has been configured and refined as described above and that serves to secure the at least one electronic part in a fixed position. The electronic component can be, for instance, an electric machine that has a stator and a rotor. The stator can have a connector ring that electrically interconnects the windings of the stator to each other and connects them to an external voltage source. In order to create electric insulation, mechanical protection and protection against chemical effects, the connector ring as well as parts of the windings can be embedded into the molding compound.

Moreover, the invention is characterized by a motor vehicle that has an electronic component configured and refined as described above.

Further measures that improve the invention will be presented in greater detail below on the basis of the description of a preferred embodiment of the invention making reference to the figures below.

BRIEF DESCRIPTION OF THE DRAWINGS

The following is shown.

DETAILED DESCRIPTION OF THE INVENTION

Figure 1A:
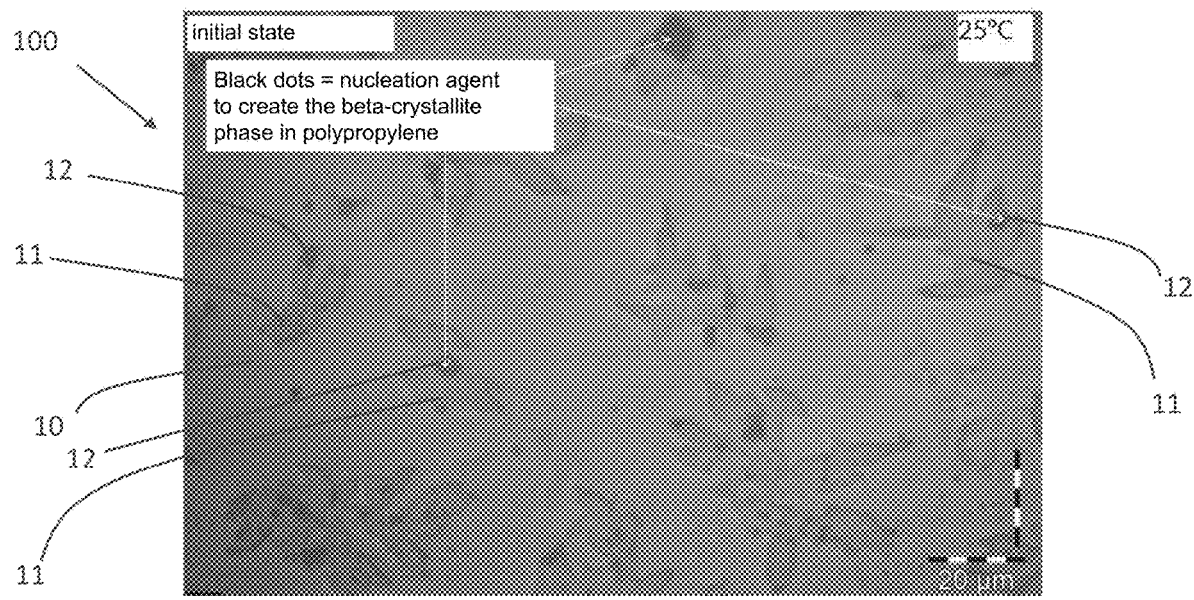
FIG. 1a: an optical-microscope image of a molding compound according to the invention, prior to a curing process in an initial state at approximately 25° C.
Figure 2A:
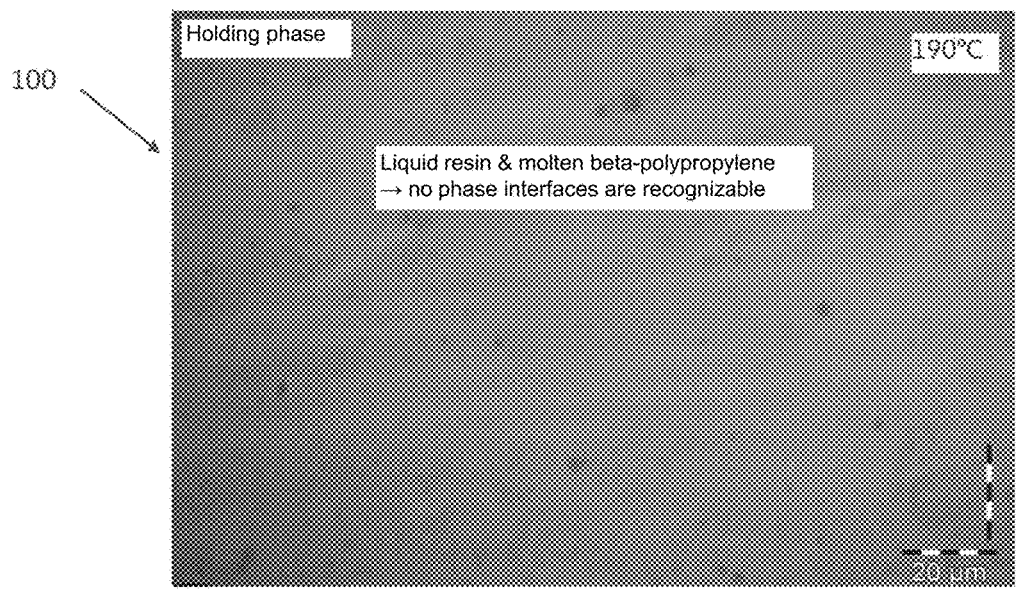
FIG. 2a: an optical-microscope image of the molding compound according to the invention, prior to the curing process in a holding phase at approximately 190° C.

FIGS. 1a to 3b schematically show the curing of a molding compound 100 according to the invention, which can be incorporated, for example, into an electronic component before the molding compound 100 starts to cure. The curing is preferably carried out in an oven in which heat is fed to the molding compound 100 and thus to the entire electronic component.

The molding compound 100 consists of a plastic main matrix 10 and of a plurality of polypropylene plastic particles 11 having a beta-crystallite structure. The plastic main matrix 10 is a thermosetting plastic, especially an epoxy resin. The polypropylene plastic particles 11 having a beta-crystallite structure are incorporated into the plastic main matrix 10 in such a way that a thorough, especially uniform, mixing of the plastic main matrix 10 and the polypropylene plastic particles 11 is achieved.

In order for the beta-crystallite structure to be formed, the polypropylene plastic particles 11 are additivated with beta-nucleation agents (preferably at a concentration of the nucleation agent in the polypropylene ranging from 0.05% to 0.5% by weight) and then preferably processed into granules which are then spun into corresponding fibers or else ground up into a powder.

Subsequently, the plastic main matrix 10 is mixed with the polypropylene plastic particles 11 in powder form or fiber form. The beta-nucleation agents can still be recognized in the form of the punctiform nucleation-agent particles 12 on the polypropylene plastic particles 11 that are distributed in the plastic main matrix 10. The nucleation agents 12 can be recognized as black dots in FIG. 1a and are shown by means of cross-hatching in FIG. 1b.

Figure 1B:
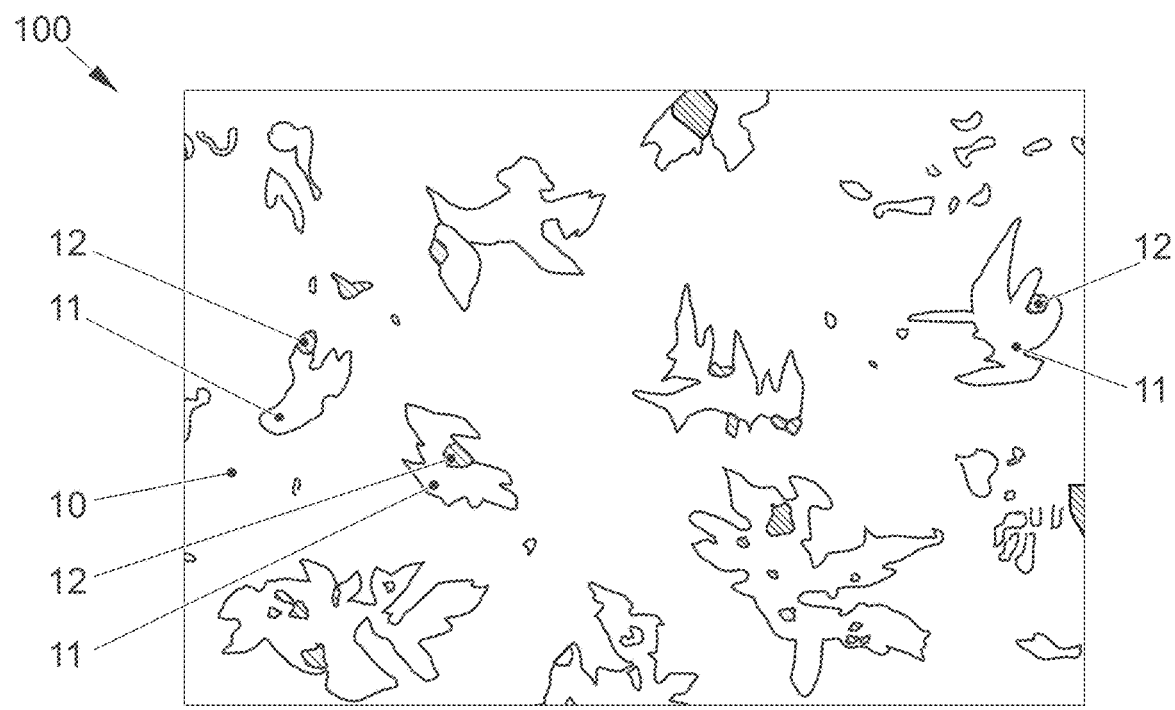
FIG. 1b: a schematic depiction of the optical-microscope image shown in FIG. 1.
Figure 2B:
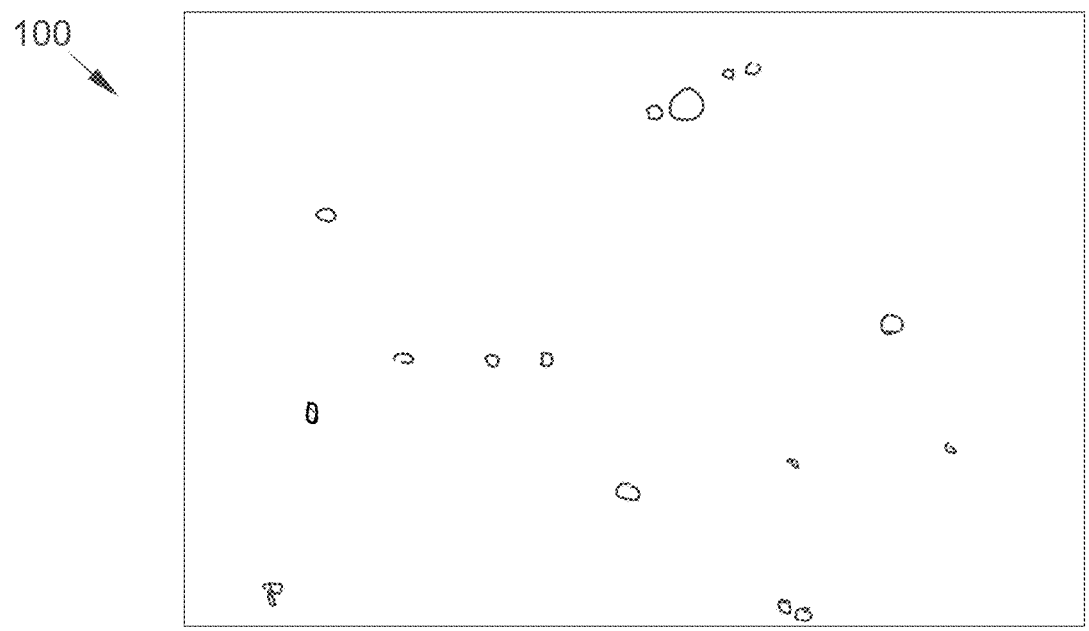
FIG. 2b: a schematic depiction of the optical-microscope image shown in FIG. 2.

FIGS. 1a and 1b show the mixture of the plastic main matrix 10, which here is, for example, a two-component epoxy resin that has not completely cured, and the polypropylene plastic particles 11 before the curing phase in an initial state. The molding compound 100 here has a temperature of approximately 25° C. In this initial state, the polypropylene plastic particles 11 are present as a separate phase in the plastic main matrix 10.

In order to achieve curing of the plastic main matrix 10 through a cross-linking process of the thermosetting plastic, the mixture or the molding compound 100 is heated up in the oven after having been applied. In this process, a heating rate of 10K/min starting at 25° C. can be prescribed. At a temperature of approximately 150° C., which constitutes the so-called gel point of the plastic main matrix 10, the polypropylene plastic particles 11 having the beta-crystallite structure also start to melt. In the holding phase shown in FIGS. 2a and 2b, during which the temperature is kept constant at approximately 190° C. for a certain period of time, preferably a period of 20 minutes, at first the plastic main matrix 10 as well as the polypropylene plastic particles 11 are present in a molten state, whereby a phase interface between the polypropylene plastic particles 11 and the plastic main matrix 10 is no longer recognizable. The curing of the plastic main matrix 10 and thus the cross-linking of the plastic main matrix 10 take place during the holding phase at an elevated temperature.

Figure 3A:
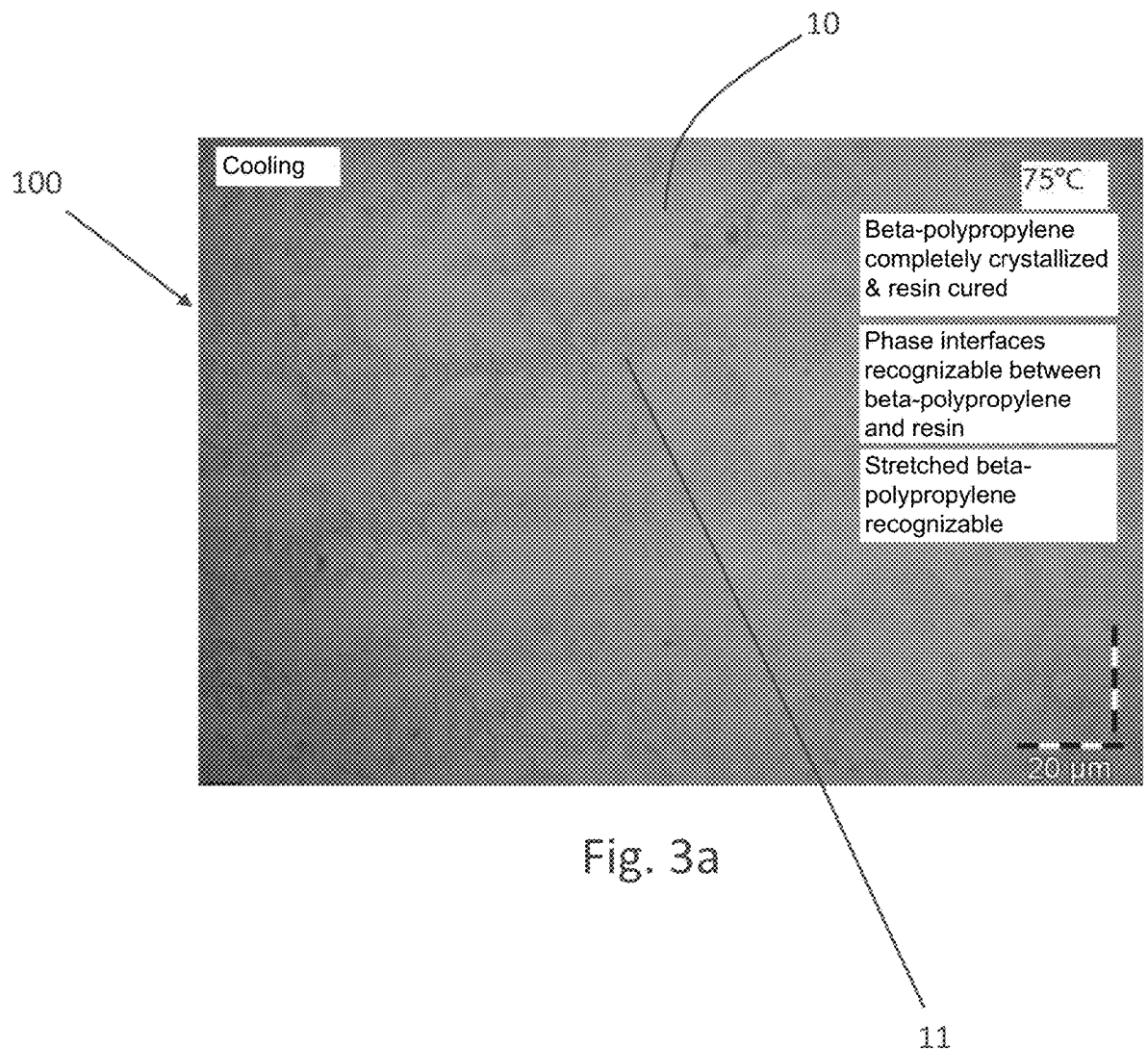
FIG. 3a: an optical-microscope image of a molding compound according to the invention, during the curing process in a cooling phase at approximately 75° C.
Figure 3B:
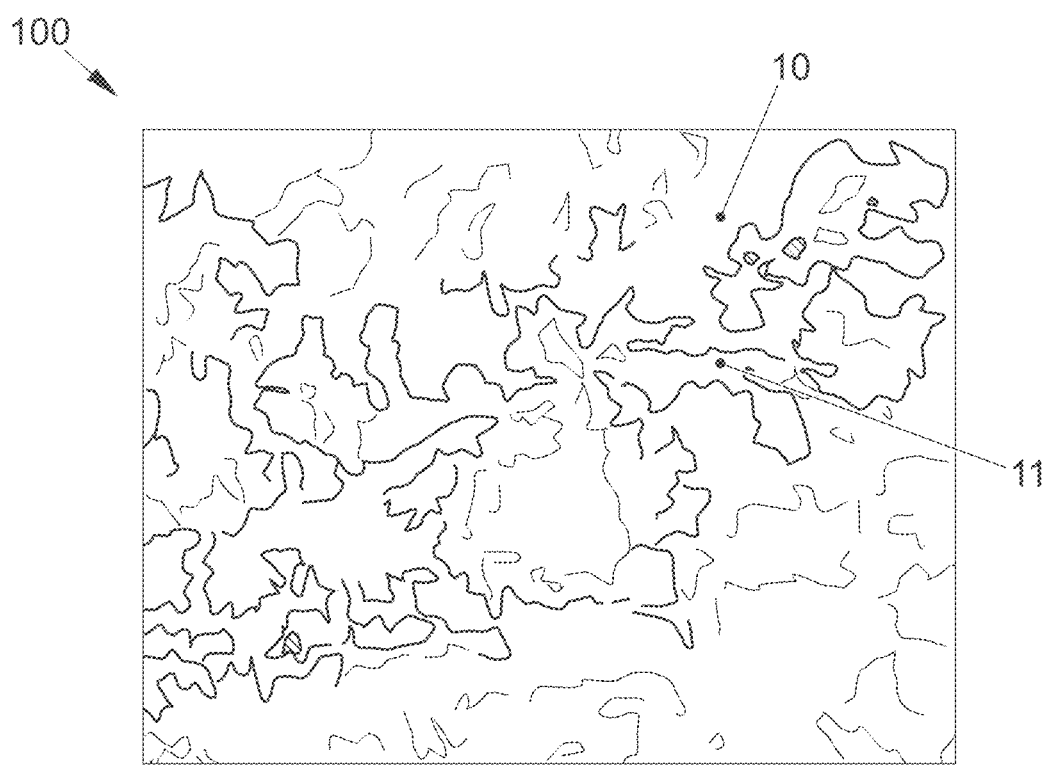
FIG. 3b: a schematic depiction of the optical-microscope image shown in FIG. 3.

After the end of the holding phase, the cooling phase begins, whereby, starting from the temperature at the level of 190° C., the cooling procedure is preferably carried out at a cooling rate of 10K/min Due to the preceding cross-linking during the holding phase, the strength and the density (reduction of the free volume) of the plastic main matrix 10 will have increased. During the cooling process, the recrystallization of the beta-nucleated polypropylene plastic particles 11 preferably sets in within the range of the glass temperature of the plastic main matrix 10 at approximately 125° C. Owing to the thermal, particularly cooling-induced, contraction during the cooling phase, especially the thermal shrinkage, of the molded electric components—such as, for instance, the laminated cores, the wire windings, the connector rings and the like—material stresses are therefore induced in the applied molding compound 100 that is made up of the plastic main matrix 10 and the polypropylene plastic particles 11. In order to reduce the material stresses that occur, the force that arises in the plastic main matrix 10 due to the material stresses is introduced into the polypropylene plastic particles 11. In this process, the polypropylene plastic particles 11 react with mechanical toughness and form a porous structure, as can be seen in FIG. 3a or 3b in the form of a meander-like structure, so that the polypropylene plastic particles 11 reduce the material stresses through stretching. After the cooling phase, the polypropylene plastic particles 11 acquire a completely crystallized and stretched form. Moreover, the plastic main matrix 10 is completely cured and the material stresses that occurred in the plastic main matrix 10 are essentially eliminated. The molding compound 100 then can no longer be shaped.

The execution of the invention is not restricted to the preferred embodiment presented above. Rather, several variants are conceivable which make use of the solutions presented, even if they are executions of a fundamentally different nature. All of the features and/or advantages—including structural details, spatial arrangements and process steps—ensuing from the claims, the description or the drawings can be essential to the invention, either on their own or in a wide array of combinations.

LIST OF REFERENCE NUMERALS

100 molding compound
10 plastic main matrix
11 polypropylene plastic particle
12 nucleation agent

The invention claimed is:

1. A molding compound for electronic components, comprising:
   a plastic main matrix, and
   beta-polypropylene particles,
   wherein:
   the plastic main matrix is cured, and
   the beta-polypropylene particles have a stretched form as a result of the beta-polypropylene particles having absorbed material stresses that occurred when the plastic main matrix was being cured.

2. The molding compound according to claim 1, wherein the beta-polypropylene particles are polypropylene plastic particles which:
   were pretreated with a hydrophilic additive or underwent a plasma treatment, and
   had beta nucleated agents added thereto.

3. The molding compound according to claim 1, wherein the beta-polypropylene particles, prior to being incorporated into the plastic main matrix, were:
   melt-blown or spun into fiber form, or
   ground into powder form.

4. The molding compound according to claim 3, wherein the beta-polypropylene particles melt-blown or spun into fiber form have a fiber diameter between 50 nm and 500 µm.

5. The molding compound according to claim 3, wherein the beta-polypropylene particles ground into powder form have a particle diameter between 0.1 µm and 1000 µm.

6. The molding compound according to claim 1, wherein the plastic main matrix consists of a thermosetting plastic.

7. The molding compound according to claim 6, wherein the thermosetting plastic is an epoxy resin, an unsaturated polyester resin, a vinyl ester resin, a melamine formaldehyde resin, a polyamide resin, an isocyanate resin or an isocyanurate resin.

8. A method for the preparation of a molding compound, the method comprising:
   incorporating beta-polypropylene particles into a plastic main matrix; and
   curing the plastic main matrix incorporating the beta-polypropylene particles,
   wherein the beta-polypropylene particles acquire a stretched form as a result of the beta-polypropylene particles having absorbed material stresses that occurred when the plastic main matrix was being cured.

9. An electronic component comprising:
   at least one electronic part; and
   the molding compound according to claim 1;
   wherein the molding compound secures the at least one electronic part in a fixed position.

10. The electric component of claim 9, wherein the electric component is a component of a motor vehicle.

11. The molding compound according to claim 3, wherein the beta-polypropylene particles incorporated in fiber form have a fiber diameter between 100 nm and 100 µm.

12. The molding compound according to claim 3, wherein the beta-polypropylene particles incorporated in powder form have a particle diameter between 10 µm and 1000 µm.

13. The method according to claim 8, further comprising:
   pre-treating polypropylene plastic particles with a hydrophilic additive, or performing a plasma treatment on the polypropylene plastic particles; and
   adding beta nucleation agents to polypropylene plastic particles to form the beta-polypropylene particles.

14. The method according to claim 8, further comprising, prior to incorporating the beta-polypropylene particles into the plastic main matrix:
   melt-blowing or spinning the beta-polypropylene particles into fibers, or
   grinding the beta-polypropylene particles into powder.

* * * * *